J. G. McFARLAND.
OIL CAKE FEEDER.
APPLICATION FILED MAR. 9, 1914.

1,129,880.

Patented Mar. 2, 1915.

Witnesses
C. M. Walker,
E. E. Alger.

Inventor
James G. McFarland
By [signature]
Attorney

UNITED STATES PATENT OFFICE.

JAMES G. McFARLAND, OF HIGGINS, TEXAS.

OIL-CAKE FEEDER.

1,129,880.     Specification of Letters Patent.     Patented Mar. 2, 1915.

Application filed March 9, 1914. Serial No. 823,502.

*To all whom it may concern:*

Be it known that I, JAMES G. MCFARLAND, a citizen of the United States, residing at Higgins, in the county of Lipscomb and State of Texas, have invented certain new and useful Improvements in Oil-Cake Feeders, of which the following is a specification.

This invention relates to oil cake feeders for cattle, sheep or the like.

The present method of feeding oil cake to cattle is to place several hundred pounds in a wagon. The wagon is drawn to the place where the cattle are located, two men accompanying the vehicle. Upon reaching the cattle, one of the men drives the team while the other throws out the cake to the cattle with a shovel, scoop or the like. The result is that the feeding cake is scattered promiscuously and the cattle tramp much of it into the ground, causing considerable waste.

By virtue of my feeding device, the man who drives the team can also regulate the supply of feed to the cattle. One man can feed the same number of cattle in a more satisfactory and economical way than two men accomplish it by the methods now employed. I am enabled to feed the cake to the ground in a very small quantity and at the proper place and in the condition desired by the driver of the vehicle. The meal is as good feed as the cake, but by the present method of feeding, the meal is a complete loss. When the cake is thrown out by a shovel, scoop or the like from the body of the vehicle, the meal is also thrown out and is scattered over the ground and the cattle are unable to eat the meal off the ground. By virtue of my improved device, the cake is fed to the ground and at the same time the loose meal is separated and delivered to the wagon body. The result is that the feeder employed by me reduces waste to a minimum and the cattle get practically all of the feed that is placed on the ground.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

Figure 1:
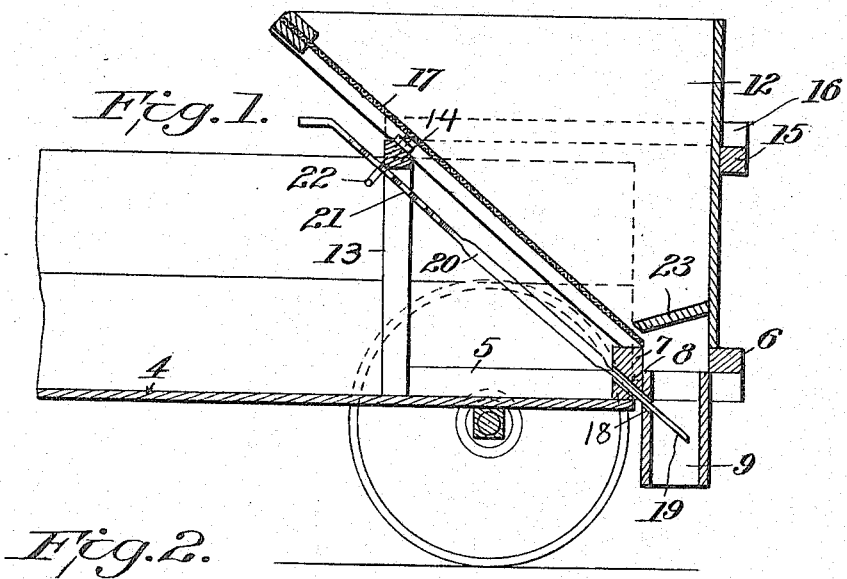
Figure 2:
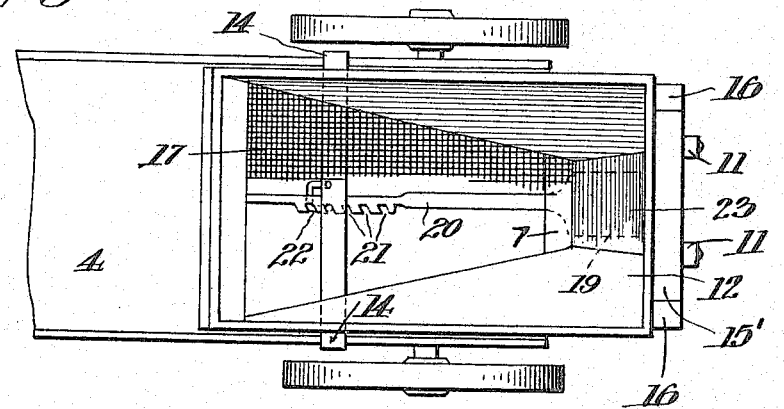
Figure 3:
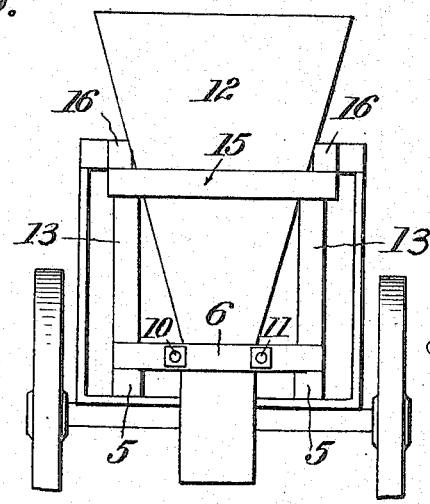

In the drawings: Figure 1 is a fragmentary vertical sectional view of a vehicle body illustrating my invention in vertical section. Fig. 2 is a top plan view. Fig. 3 is an end view.

Referring now more particularly to the accompanying drawings, the reference character 4 indicates a portion of a wagon body in which my improved feeder is mounted in any suitable manner.

The character 5 indicates a pair of longitudinal sills connected at their outer ends by spaced cross-sills 6 and 7, the latter having a slot 8 for a purpose presently explained. These longitudinal and transverse sills 5 and 6—7, respectively, are designed to support the feed spout 9 at the rear end of the vehicle body, the spout at its upper end being secured to the transverse sills 6 and 7 in any suitable manner. These transverse sills may be braced, if desired, by means of the connecting bolts 10 and 11.

Coöperating with the spout 9 is a hopper 12. The hopper 12 may be supported in coöperative relation with the feed spout 9 by means of any suitable framework. As illustrated, this framework consists of spaced uprights 13 secured in any suitable manner at their lower ends to the inner ends of the aforesaid longitudinal sills 5 and at their upper ends to a horizontal beam 14 whose ends are adapted to rest upon the upper edges of the sides of the body 4, as best illustrated in Fig. 2. Secured to the upper side of the hopper 12 in horizontal alinement with the aforesaid transverse beam 5 is a beam 15. These beams 14 and 15 are connected by horizontal beams 16 which are secured thereto in any suitable manner and which extend upon opposite sides of the hopper 12, whereby the hopper is embraced by its framework and firmly supported in coöperative relation with the feed box 9. The front of the hopper is inclined, as shown and is preferably formed of foraminated material 17.

The box 9 is provided with a slot 18 disposed in alinement with the aforesaid slot 8 in the cross piece 7 so as to slidably receive a cut-off 19 provided with a shank 20 having a serrated or toothed edge 21 designed to engage the keeper 22 carried by the aforesaid transverse beam 14 whereby the cut-off may be held adjustably in predetermined positions with relation to the spout box so that the oil cake may be fed in regular quantities.

In oil cake there is more or less meal. This meal is as good for food purposes as the cake but when delivering the cake to the ground under present methods, the meal is scattered and can not be eaten off the ground by the cattle with the result that this meal goes to waste. It is therefore one object of the present invention to reduce this unnecessary waste to a minimum and to accomplish this purpose the screened or foraminated front of the hopper is provided so that when the oil cake and loose meal are shoveled or otherwise placed in the hopper 12, the cakes pass to the spout 9 while most of the meal passes through the foraminated front 17 into the vehicle body, there being a shelf 23 provided in the hopper 12 which extends almost to the foraminated front 17 of the hopper for the purpose of forcing the cake to pass over the screen before passing to the spout box, thereby thoroughly sifting from the cake any and all meal that is fed loose with the same and causing it to fall into the vehicle body, thus preventing waste of the meal.

What I claim is:—

1. An oil cake feeding device comprising a framework, a spout depending from the framework, a hopper secured to the framework to feed the cake to said spout, the front of the hopper being composed of foraminated material, a keeper secured to said framework, a cut-off slidable in said spout and provided with a shank having a serrated edge for engagement with said keeper, and a shelf in the hopper which extends almost to the foraminated front thereof.

2. The combination of a vehicle body, a framework mounted in the body including a transverse beam adapted to engage the upper edges of the sides of the body and also including spaced transverse beams, a feed spout arranged between the latter beams and depending therefrom, a hopper communicating with the feed spout and whose front is inclined over the bottom of the body, a keeper carried by the first-mentioned beam, and a cut-off for the feed spout to regulate the feed of oil cake and having a shank engageable with said keeper to hold the cut-off in adjusted positions.

3. The combination of a vehicle body, a frame work mounted in the body including a transverse beam adapted to engage the upper edges of the sides of the body and also including spaced transverse beams, a feed spout arranged between the latter beams and depending therefrom, a hopper communicating with the feed spout and whose front is inclined over the bottom of the body, a keeper carried by the first-mentioned beam, and a cut-off for the feed spout to regulate the feed of oil cake and having a shank engageable with said keeper to hold the cut-off in adjusted positions and a shelf in the hopper to direct the material toward the foraminated front of the hopper.

In testimony whereof I affix my signature in presence of two witnesses.

JAMES G. McFARLAND.

Witnesses:
H. L. ADKINS,
W. H. SEWELL.

Copies of this patent may be obtained for five cents each, by addressing the "Commissioner of Patents, Washington, D. C."